United States Patent
Jitsukawa et al.

(10) Patent No.: US 10,608,717 B2
(45) Date of Patent: Mar. 31, 2020

(54) TRANSMISSION CONTROL DEVICE, RADIOCOMMUNICATION SYSTEM, AND CALIBRATION METHOD

(71) Applicant: FUJITSU LIMITED, Kawasaki-shi, Kanagawa (JP)

(72) Inventors: Daisuke Jitsukawa, Adachi (JP); Takashi Dateki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 267 days.

(21) Appl. No.: 15/636,883

(22) Filed: Jun. 29, 2017

(65) Prior Publication Data
US 2018/0026690 A1  Jan. 25, 2018

(30) Foreign Application Priority Data

Jul. 20, 2016  (JP) .................. 2016-142708

(51) Int. Cl.
*H04B 7/06* (2006.01)
*H04B 1/405* (2015.01)
(Continued)

(52) U.S. Cl.
CPC ........... *H04B 7/0613* (2013.01); *H01Q 3/267* (2013.01); *H04B 1/405* (2013.01); *H04B 7/005* (2013.01);
(Continued)

(58) Field of Classification Search
CPC ...... H04B 7/0613; H04B 17/11; H04B 17/21; H04B 17/309; H04B 1/405; H04B 7/005;
(Continued)

(56) References Cited

U.S. PATENT DOCUMENTS 5,884,184 A * 3/1999 Sheffer ................. H04W 24/10
340/3.1
7,440,416 B2 * 10/2008 Mahany ................ H04L 1/0002
370/235
(Continued)

FOREIGN PATENT DOCUMENTS

JP  2003258811 A * 9/2003 ............. H04L 12/28
JP  3805701 B2 * 8/2006 ........... H04L 12/733
(Continued)

OTHER PUBLICATIONS

Yasunori Noda, et al., "An Antenna Array Auto-Calibration Method with Bidirectional Channel Measurement for TDD Systems", The Institute of Electronics, Information and Communication Engineers, IEICE Technical Report RCS2008-12, May 2008 (6 pages).
(Continued)

*Primary Examiner* — Peter M Bythrow
*Assistant Examiner* — Nuzhat Pervin
(74) *Attorney, Agent, or Firm* — Fujitsu Patent Center

(57) ABSTRACT

A transmission control device includes a memory and a processor connected to the memory. The processor executes a process including: selecting a reference transmission point as a starting point of generating a link from among a plurality of transmission points of which each wirelessly transmits a signal; sequentially selecting the transmission points one by one for each hierarchy corresponding to a number of hops from the selected reference transmission point and retrieving ones of the transmission points for which radio quality between the ones and the selected transmission point satisfies a predetermined criterion; and generating a link between the selected transmission point and a transmission point, among the transmission points obtained as a result at the retrieving, not connected to others
(Continued)

of the transmission points to connect the two transmission points.

6 Claims, 9 Drawing Sheets

(51) Int. Cl.
```
H04B 7/005      (2006.01)
H04B 17/21      (2015.01)
H04B 7/12       (2006.01)
H04B 7/212      (2006.01)
H04B 7/208      (2006.01)
H01Q 3/26       (2006.01)
```
(52) U.S. Cl.
CPC ............... *H04B 7/12* (2013.01); *H04B 7/208* (2013.01); *H04B 7/2126* (2013.01); *H04B 17/21* (2015.01)

(58) Field of Classification Search
CPC ........ H04B 7/12; H04B 7/208; H04B 7/2126; H01Q 3/267
USPC .......................................................... 342/174
See application file for complete search history.

(56) References Cited

U.S. PATENT DOCUMENTS

| | | | | |
|---|---|---|---|---|
| 7,583,639 | B2 * | 9/2009 | Mahany | H04B 1/707 370/335 |
| 7,586,861 | B2 * | 9/2009 | Kubler | G06F 1/1626 370/310 |
| 7,804,849 | B2 * | 9/2010 | Mahany | H04L 1/0002 370/230 |
| 8,238,264 | B2 * | 8/2012 | Kubler | G06F 1/1626 370/254 |
| 8,526,329 | B2 * | 9/2013 | Mahany | H04L 1/0002 370/235 |
| 8,855,007 | B2 * | 10/2014 | Gupta | H04W 8/26 370/254 |
| 10,284,308 | B1 * | 5/2019 | Elwailly | H04B 17/21 |
| 2004/0125753 | A1 * | 7/2004 | Mahany | H04L 1/0002 370/254 |
| 2005/0227699 | A1 * | 10/2005 | Schreuder | H04W 28/08 455/453 |
| 2006/0183504 | A1 * | 8/2006 | Tanaka | H04B 17/21 455/561 |
| 2006/0256741 | A1 * | 11/2006 | Nozaki | H04L 45/00 370/278 |
| 2007/0115868 | A1 * | 5/2007 | Chen | G08G 1/163 370/315 |
| 2009/0080398 | A1 * | 3/2009 | Mahany | H04L 1/0002 370/338 |
| 2009/0252136 | A1 * | 10/2009 | Mahany | H04B 1/707 370/338 |
| 2011/0007724 | A1 * | 1/2011 | Mahany | H04L 1/0002 370/338 |
| 2012/0219089 | A1 * | 8/2012 | Murakami | H04L 25/0222 375/296 |
| 2014/0155006 | A1 * | 6/2014 | Matsuura | H04B 7/005 455/114.3 |
| 2014/0273879 | A1 * | 9/2014 | Coan | H04B 17/21 455/67.14 |
| 2014/0341317 | A1 * | 11/2014 | Murakami | H04L 1/007 375/296 |
| 2016/0183209 | A1 * | 6/2016 | Inoue | H04B 17/12 375/362 |

FOREIGN PATENT DOCUMENTS

| | | | |
|---|---|---|---|
| JP | 2012-151629 | 8/2012 | |
| JP | 2013-243519 | 12/2013 | |
| WO | WO-2005025147 A1 * | 3/2005 | ............ H04L 45/04 |
| WO | WO-2009067452 A1 * | 5/2009 | ............ H04W 8/26 |
| WO | 2015022823 | 2/2015 | |

OTHER PUBLICATIONS

JPOA—Office Action for Japanese Patent Application No. 2016-142708 dated Jan. 21, 2020, with English translation.

* cited by examiner

FIG.8

| SIR | CAL ERROR |
|---|---|
| TO $A_1$ | $B_1$ |
| $A_1$ TO $A_2$ | $B_2$ |
| $A_2$ TO $A_3$ | $B_3$ |
| ⋮ | ⋮ |

TRANSMISSION CONTROL DEVICE, RADIOCOMMUNICATION SYSTEM, AND CALIBRATION METHOD

CROSS-REFERENCE TO RELATED APPLICATION

This application is based upon and claims the benefit of priority of the prior Japanese Patent Application No. 2016-142708, filed on Jul. 20, 2016, the entire contents of which are incorporated herein by reference.

FIELD

The embodiments discussed herein are related to a transmission control device, a radio communication system, and a calibration method.

BACKGROUND

Typically, a radio communication system, which employs TDD (Time Division Duplex) in which transmission and reception are performed in a time-division manner, transmits and receives a signal having the same frequency band over an uplink and a downlink. For this reason, it can be considered that radio channels of the uplink and downlink are equal due to a symmetric property of the radio channels. By using the property, for example, a base station device performs channel estimation of an uplink by using a reference signal of the uplink transmitted from a user terminal, considers a channel estimation value of the uplink as a channel estimation value of a downlink, and performs precoding etc. of a signal of the downlink.

Meanwhile, the radio channels of the uplink and downlink are symmetric and equal, but transmission characteristics of transmitter-receiver circuits of devices such as the base station device and the user terminal are different from each other. For this reason, for example, the channel estimation value of the uplink that the base station device estimates from the reference signal of the uplink does not precisely indicate a channel of the actual downlink.

In other words, for example, the signal of the uplink passes through a transmitter circuit of the user terminal and passes through a receiver circuit of the base station device after passing through the radio channel of the uplink. On the contrary, the signal of the downlink passes through a transmitter circuit of the base station device and passes through a receiver circuit of the user terminal after passing through the radio channel of the downlink. For this reason, the channel of the uplink for which the base station device performs channel estimation includes the transmitter circuit of the user terminal and the receiver circuit of the base station device, and the channel of the actual downlink includes the transmitter circuit of the base station device and the receiver circuit of the user terminal. Herein, because the transmission characteristics of the transmitter circuit and receiver circuit are different between the base station device and the user terminal, the channels of the uplink and downlink are different from each other due to the difference of transmission characteristics of the transmitter-receiver circuits.

Therefore, calibration can be performed to obtain a precise channel estimation value of a downlink from the channel estimation value of an uplink. Calibration is a process for calibrating a difference between transmission characteristics of a plurality of transmitter-receiver circuits. For example, a relative relationship such as phase rotation and amplitude fluctuation in a plurality of channels is obtained by transmitting and receiving a test signal. Specifically, as illustrated in FIG. 9, calibration between a device 1 including a transmitter circuit T1 and a receiver circuit R1 and a device k including a transmitter circuit Tk and a receiver circuit Rk will be explained, for example.

A channel estimation value $h_{1,k}$ and a channel estimation value $h_{k,1}$ are obtained by transmitting and receiving a test signal between two antennas illustrated in FIG. 9. Herein, the channel estimation value $h_{1,k}$ is an estimation value of a channel that consists of the transmitter circuit T1 expressed with a transfer function $T_1$, a radio channel, and the receiver circuit Rk expressed with a transfer function $R_k$, and the channel estimation value $h_{k,1}$ is an estimation value of a channel that consists of the transmitter circuit Tk expressed with a transfer function $T_k$, a radio channel, and the receiver circuit R1 expressed with a transfer function $R_1$. The ratio of the channel estimation values $h_{1,k}$ and $h_{k,1}$ is expressed with the following Equation (1).

$$\frac{h_{l,k}}{h_{k,l}} = \frac{R_k \cdot g_{l,k} \cdot T_l}{R_l \cdot g_{k,l} \cdot T_k} = \frac{R_k / T_k}{R_l / T_l} \quad (1)$$

In Equation (1), $g_{1,k}$ and $g_{k,1}$ are propagation path values of the radio channels, and can be considered as the same value in bidirectional transmission and reception. When a correction coefficient $u_1$ for the transmitter circuit T1 and the receiver circuit R1 of the device 1 is defined as "1" from Equation (1), a correction coefficient $u_k$ for the transmitter circuit Tk and the receiver circuit Rk of the device k becomes the following Equation (2).

$$u_k = \frac{u_k}{u_l} = \frac{R_k / T_k}{R_l / T_l} = \frac{h_{l,k}}{h_{k,l}} \quad (2)$$

By obtaining the correction coefficient $u_k$ of the device k in this way, if the correction coefficient $u_k$ is multiplied by the channel estimation value $h_{k,1}$ of the signal transmitted from the device k to the device 1, for example, the precise channel estimation value $h_{1,k}$ of the channel from the device 1 to the device k is obtained.

Calibration is performed also in CoMP (Coordinated Multi-Point transmission) for transmitting a signal to a user terminal through cooperation between a plurality of transmission points, for example. When signals are transmitted from the plurality of transmission points, calibration for calibrating a difference between transmission characteristics of transmitter-receiver circuits of the transmission points is performed. In other words, a test signal is transmitted and received between a user terminal and each of two transmission points to be calibrated, for example, and a channel estimation value of a downlink is fed back from the user terminal, and thus calibration between the two transmission points is performed. As described above, by forming pairs of which each is selected from among the plurality of transmission points and sequentially calibrating each of the pairs, calibration for all the transmission points of the radio communication system can be realized.

Patent Literature 1: International Publication Pamphlet No. WO 2015/022823

Non-Patent Literature 1: Yasunori Nouda, Yoshitaka Hara, Yasuhiro Yano, Hiroshi Kubo, "An Antenna Array Auto- Calibration Method with Bidirectional Channel Measurement for TDD Systems", technical report RCS 2008-12, IEICE, May, 2008

However, there is a problem that processing amount for forming pairs of transmission points is increased when calibration is performed on a plurality of transmission points. Specifically, as described above for example, when calibration is performed by transmitting and receiving a test signal between a user terminal and each of two transmission points to be calibrated, calibration is difficult to be performed if there is not a user terminal that can wirelessly communicate with two transmission points at the same time. In other words, when an SIR (signal-to-interference ratio) between a user terminal used for calibration and two transmission points does not satisfy a predetermined criterion, for example, reliability of calibration becomes lower even if a channel estimation value of a test signal is fed back from the user terminal. For this reason, when forming pairs of transmission points, a process for determining whether a user terminal satisfying a condition exists is performed with respect to each pair, for example, and thus processing amount forming pairs is increased.

In particular, recently, there is considered a large-scale cooperative system that transmits signals through cooperation between several transmission points connected to one baseband processing device, and thus the conceivable number of pairs of transmission points tends to increase. For this reason, processing amount for determining pairs having a good calibration execution condition is further increased.

SUMMARY

According to an aspect of an embodiment, a transmission control device includes a memory and a processor connected to the memory. The processor executes a process including: selecting a reference transmission point as a starting point of generating a link from among a plurality of transmission points of which each wirelessly transmits a signal; sequentially selecting the transmission points one by one for each hierarchy corresponding to a number of hops from the selected reference transmission point and retrieving ones of the transmission points for which radio quality between the ones and the selected transmission point satisfies a predetermined criterion; and generating a link between the selected transmission point and a transmission point, among the transmission points obtained as a result at the retrieving, not connected to others of the transmission points to connect the two transmission points.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating a specific example of a CAL error table; and

DESCRIPTION OF EMBODIMENTS

Preferred embodiments of the present invention will be explained with reference to accompanying drawings. The disclosed technology is not limited to the embodiments explained below.

Figure 1:
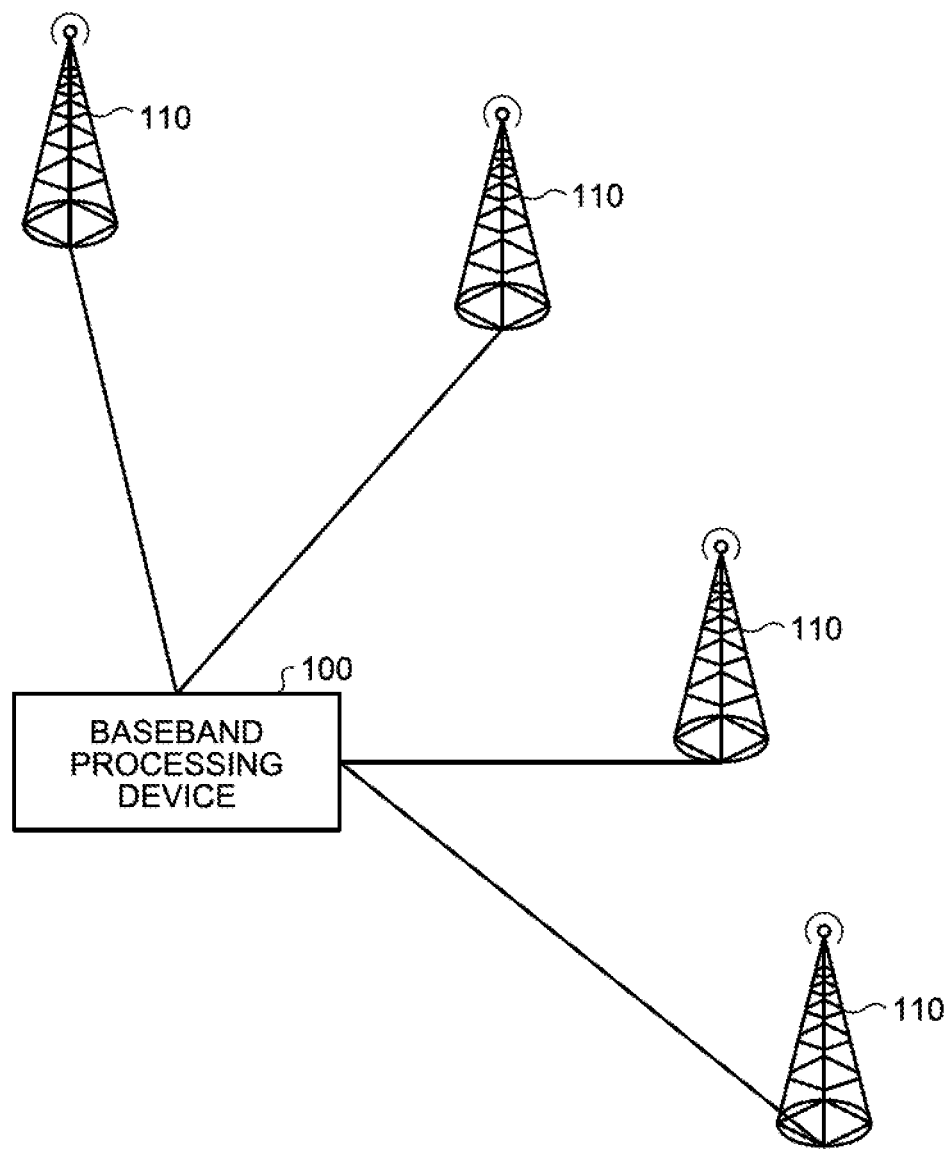
FIG. 1 is a diagram illustrating the configuration of a radio communication system according to an embodiment.

FIG. 1 is a diagram illustrating the configuration of a radio communication system according to the embodiment. As illustrated in FIG. 1, the radio communication system includes a baseband processing device 100 and a plurality of transmission points 110. Each of the transmission points 110 is connected to the baseband processing device 100. Although it is omitted in FIG. 1, other transmission points may be connected to another baseband processing device.

When transmitting a signal with respect to a user terminal that is not illustrated, the baseband processing device 100 causes the plurality of transmission points 110 to cooperate with each other so as to transmit the signal. In other words, the baseband processing device 100 generates a baseband signal for a user terminal and precodes the baseband signal, and then transmits the baseband signal to the transmission point 110 as a transmission source. At this time, the baseband processing device 100 computes a channel estimation value of a downlink from each the transmission point 110 toward the user terminal on the basis of a channel estimation value of an uplink from the user terminal toward each the transmission point 110, and generates a precoding matrix from the channel estimation value of the downlink.

The baseband processing device 100 performs calibration of the plurality of transmission points 110 in order to perform cooperative transmission by the plurality of transmission points 110. In other words, the baseband processing device 100 forms a pair from among the plurality of transmission points 110 connected to the device itself, and generates a link for calibration (hereinafter, called "CAL link") between the transmission points 110 of the formed pair. Then, the baseband processing device 100 causes the transmission points to transmit and receive a reference signal for calibration (hereinafter, called "CAL signal") via the CAL link, and performs calibration between the transmission points 110.

When generating CAL links, the baseband processing device 100 retrieves transmission points, among the transmission points 110, which satisfy a condition between the retrieved transmission points and the starting-point transmission point 110, sets the retrieved transmission points 110 as first-layer transmission points, and generates CAL links between the starting-point transmission point 110 and the first-layer transmission points. Then, the baseband processing device 100 retrieves transmission points, among the transmission points 110, which satisfy the condition between the retrieved transmission points and each of the first-layer transmission points, sets the retrieved transmission points 110 as second-layer transmission points, and generates CAL links between the corresponding first-layer transmission point and the second-layer transmission points. Hereinafter, the baseband processing device 100 repeatedly generates CAL links for each hierarchy corresponding to the number of hops from the starting-point transmission point 110, and generates CAL links between the transmission points 110 to be connected to the device itself. At this time, if the transmission point 110 is once connected by a CAL link, the baseband processing device 100 does not modify the CAL link even if it is good that the connected transmission point is connected to the other transmission point 110 by way of another CAL link. In other words, the baseband processing device 100 connects, among one or more of the transmission points 110 that satisfy the condition between the one or more and the certain upper-hierarchy transmission point 110, only the transmission points 110 not connected to the other transmission points 110 with the upper-hierarchy transmission point 110. The generation of CAL links performed by the baseband processing device 100 will be explained in detail later.

The transmission point 110 wirelessly communicates with a user terminal that is not illustrated. In other words, when receiving a baseband signal for the user terminal from the baseband processing device 100, the transmission point 110 performs a predetermined radio transmission process with respect to the baseband signal, and wirelessly transmits the baseband signal via an antenna. Moreover, the transmission point 110 receives a signal wirelessly transmitted from the user terminal via the antenna, and performs a predetermined radio reception process with respect to the received signal. Then, the transmission point 110 transmits a baseband signal obtained by the radio reception process to the baseband processing device 100.

The transmission point 110 includes a transmitter circuit and a receiver circuit for each antenna. The transmitter circuit performs a radio transmission process such as D/A (Digital/Analog) conversion and up-conversion, for example, and the receiver circuit performs a radio reception process such as down-conversion and A/D (Analog/Digital) conversion, for example.

Because the transmitter circuit and receiver circuit for each antenna have different transmission characteristics, calibration is performed by the baseband processing device 100 as described above. In the event of calibration, the transmitter circuit performs a radio transmission process with respect to a calibration signal, and transmits the calibration signal after the radio transmission process via the CAL link generated by the baseband processing device 100. Moreover, the receiver circuit receives the calibration signal via the CAL link generated by the baseband processing device 100, and performs a radio reception process with respect to the received calibration signal.

When the transmission point 110 includes a plurality of antennas, calibration between reference antennas previously determined in each of the transmission points 110 may be performed. In this case, if calibration between the reference antenna and another antenna is performed for each of the transmission points 110, calibrations between all the transmission points 110 and between all the antennas are consequently performed.

Figure 2:
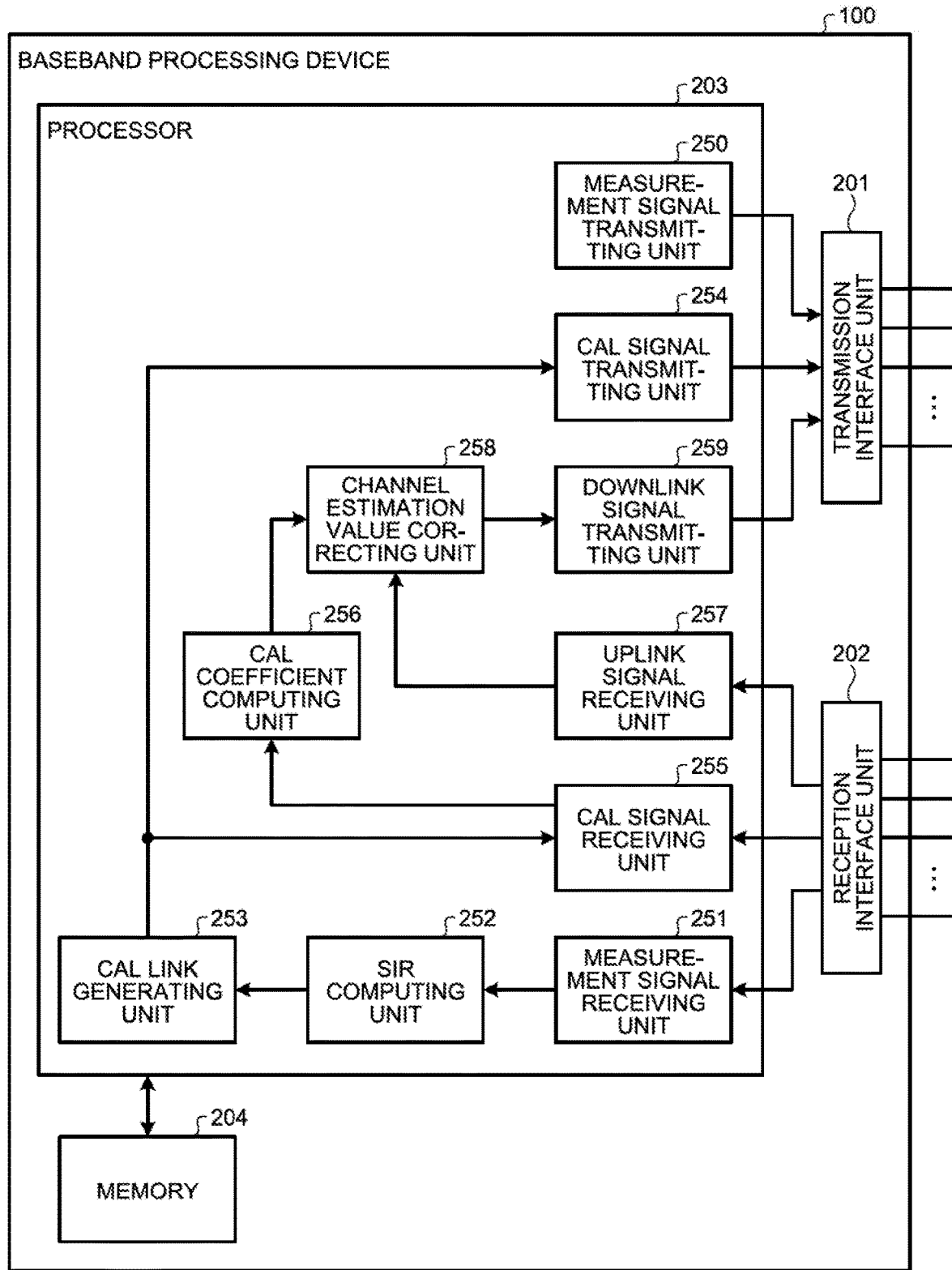
FIG. 2 is a block diagram illustrating the configuration of a baseband processing device according to the embodiment.

FIG. 2 is a block diagram illustrating the configuration of the baseband processing device 100 according to the embodiment. The baseband processing device 100 illustrated in FIG. 2 includes a transmission interface unit 201, a reception interface unit 202, a processor 203, and a memory 204.

The transmission interface unit 201 is connected to the plurality of transmission points 110, and transmits signals output from the processor 203 to the transmission points 110.

The reception interface unit 202 is connected to the plurality of transmission points 110, and receives signals transmitted from the transmission points 110 and outputs the signals to the processor 203.

The processor 203 includes a central processing unit (CPU), a field programmable gate array (FPGA), a digital signal processor (DSP), or the like, and performs various processes by using the memory 204. Specifically, the processor 203 includes a measurement signal transmitting unit 250, a measurement signal receiving unit 251, an SIR computing unit 252, a CAL link generating unit 253, a CAL signal transmitting unit 254, a CAL signal receiving unit 255, a CAL coefficient computing unit 256, an uplink signal receiving unit 257, a channel estimation value correcting unit 258, and a downlink signal transmitting unit 259.

The measurement signal transmitting unit 250 causes the transmission points 110 to sequentially transmit a well-known measurement signal for measuring an SIR (signal-to-interference ratio) between the transmission points 110. In other words, the measurement signal transmitting unit 250 causes the transmission points 110 connected to the transmission interface unit 201 to sequentially transmit a measurement signal one by one. The measurement signal transmitting unit 250 causes each of the transmission points 110 to transmit a measurement signal in a predetermined period such as once a day. Moreover, when an average reception level of CAL signals received by the CAL signal receiving unit 255 to be described later is less than a predetermined threshold, for example, the measurement signal transmitting unit 250 may cause each of the transmission points 110 to transmit a measurement signal. The measurement signal is used for generating a CAL link between the transmission points 110.

The measurement signal receiving unit 251 receives measurement signals that are sequentially transmitted from the transmission points 110 and are received by the other transmission points 110. In other words, as described above, because the transmission points 110 sequentially transmit measurement signals one by one, each of the transmission points 110 receives measurement signals transmitted from the transmission points 110 other than the corresponding one. Moreover, transmission and reception of measurement signals by the measurement signal transmitting unit 250 and the measurement signal receiving unit 251 may be performed by using a guard period (GP) placed at a boundary at which switching is performed between a downlink and an uplink in the TDD method, for example.

The SIR computing unit 252 measures radio quality between the transmission points 110 by using the measurement signals received by the measurement signal receiving unit 251. Specifically, the SIR computing unit 252 computes SIRs of measurement signals transmitted bidirectionally for each of combinations of the two transmission points 110. Therefore, the SIR computing unit 252 computes bidirectional SIRs for all pairs of the transmission points 110.

The CAL link generating unit 253 generates a CAL link between one pair of the transmission points 110 that performs calibration by using the SIRs computed by the SIR computing unit 252. In other words, the CAL link generating unit 253 determines one pair of the transmission points 110 whose radio quality satisfies a predetermined criterion, and connects the paired transmission points 110 to each other by using a CAL link.

Specifically, the CAL link generating unit 253 determines one of the transmission points 110 as a starting point, and retrieves others of the transmission points 110 whose SIRs between the others and the starting-point transmission point 110 are not less than a predetermined threshold. Then, the CAL link generating unit 253 sets the retrieved transmission points 110 as first-layer transmission points, and generates CAL links between the starting-point transmission point 110 and the first-layer transmission points 110.

Furthermore, the CAL link generating unit 253 sequentially selects the first-layer transmission points 110 one by one, and retrieves ones of the transmission points 110 whose SIRs between the ones and the selected transmission point 110 are not less than the predetermined threshold. Then, the CAL link generating unit 253 sets transmission points, among the retrieved transmission points 110, not connected to the other transmission points 110, as second-layer transmission points, and generates CAL links between the selected first-layer transmission point 110 and the second-layer transmission points 110.

Hereinafter, the CAL link generating unit 253 repeatedly performs the process, and when all the first-layer transmission points 110 are connected to the second-layer transmission points 110, sequentially selects the second-layer transmission points 110 one by one to generate CAL links between the selected second-layer transmission point and third-layer transmission points 110. At this time, even in case of the transmission points 110 whose SIRs are not less than a predetermined threshold and that satisfy a criterion, the CAL link generating unit 253 determines a pair of the transmission points 110 with the exception of the transmission points 110 already connected to the other transmission points 110. Therefore, the CAL link generating unit 253 generates CAL links in sequence from a high-order hierarchy close to the starting-point transmission point 110, and does not change the already-generated CAL link. For this reason, the increase of processing amount of generating CAL links can be suppressed.

The CAL signal transmitting unit 254 causes each of the transmission points 110 to transmit a CAL signal via the corresponding CAL link generated by the CAL link generating unit 253. At this time, the CAL signal transmitting unit 254 may cause the plurality of transmission points 110 to simultaneously transmit the CAL signals. However, because the one transmission point 110 simultaneously does not perform the transmission and reception of the CAL signal, the CAL signal transmitting unit 254 sets, for example, only the even-hierarchical transmission points 110 or only the odd-hierarchical transmission points 110 as the transmission points 110 that simultaneously transmit the CAL signals. Because the odd-hierarchical transmission points 110 perform the generation of CAL links with the even-hierarchical transmission points 110, the odd-hierarchical transmission points 110 can receive the CAL signals even if the plurality of even-hierarchical transmission points 110 simultaneously transmits the CAL signals. Moreover, when simultaneously transmitting the CAL signals from the plurality of transmission points 110, the CAL signal transmitting unit 254 uses series perpendicular to each other as the CAL signals transmitted from the transmission points 110.

The CAL signal receiving unit 255 receives the CAL signals received in the transmission points 110 via the CAL links generated by the CAL link generating unit 253.

The CAL coefficient computing unit 256 performs channel estimation by using the CAL signals received by the CAL signal receiving unit 255, and computes a calibration coefficient (hereinafter, abbreviated to "CAL coefficient") for calibrating a difference between transmission characteristics of the transmitter circuit and receiver circuit of each of the transmission points 110. Specifically, the CAL coefficient computing unit 256 generates the following calibration matrix C.

In other words, a channel estimation value $h_{TP(m,n)}$ when a signal is transmitted from a transmission point #m (m is integer number) connected by a CAL link to a transmission point #n (n is integer number, n≠m) and a channel estimation value $h_{TP(n,m)}$ when a signal is transmitted in a backward direction are respectively expressed as follows.

$$h_{TP(m,n)} = R_n \cdot g_{TP(m,n)} \cdot T_m$$

$$h_{TP(n,m)} = R_m \cdot g_{TP(n,m)} \cdot T_n$$

Herein, $g_{TP(m,n)}$ and $g_{TP(n,m)}$ are propagation path values of radio channels, and can be considered as the same value in bidirectional transmission and reception. Moreover, $T_m$ and $R_m$ are transfer functions of the transmitter circuit and receiver circuit of the transmission point #m, and $T_n$ and $R_n$ are transfer functions of the transmitter circuit and receiver circuit of the transmission point #n. These channel estimation values are obtained by performing channel estimation on the CAL signals received by the CAL signal receiving unit 255. Herein, it is assumed that a calibration coefficient $c_{m,n}$ between the transmission point #m and the transmission point #n directly connected by the CAL link is a ratio of channel estimation values as follows.

$$c_{m,n} = \frac{h_{TP(m,n)}}{h_{TP(n,m)}} = \frac{R_n \cdot g_{TP(m,n)} \cdot T_m}{R_m \cdot g_{TP(n,m)} \cdot T_n} = \frac{R_n}{T_n} \cdot \frac{T_m}{R_m}$$

Because each of the transmission points 110 is connected by a CAL link, the two arbitrary transmission points 110 can be connected to each other by way of one or more CAL links. Therefore, when the nine transmission points 110 #0 to #8 are connected to the baseband processing device 100, for example, calibration coefficients $c_0$ to $c_8$ of the transmission points #0 to #8 whose reference is the transmission point #0 are expressed as follows for example.

$$c_0 = 1$$

$$c_1 = c_{0,1}$$

$$c_2 = c_{0,2}$$

$$c_3 = c_{0,3}$$

$$c_4 = c_{0,1} \cdot c_{1,4}$$

$$c_5 = c_{0,1} \cdot c_{1,5}$$

$$c_6 = c_{0,2} \cdot c_{2,6}$$

$$c_7 = c_{0,2} \cdot c_{2,7}$$

$$c_8 = c_{0,8}$$

In these calibration coefficients, because the calibration coefficients $c_1$, $c_2$, $c_3$, and $c_8$ are equal to the calibration coefficients between the transmission points 110 connected by the CAL links, for example, it turns out that the transmission points #1, #2, #3, and #8 are the transmission points 110 directly connected to the transmission point #0. On the other hand, because the calibration coefficients $c_4$, $c_5$, $c_6$, and $c_7$ are expressed by products of the calibration coefficients between the transmission points 110 connected by the CAL links, it turns out that the transmission points #4, #5, #6, and #7 are the transmission points 110 connected to the transmission point #0 by way of the other transmission points 110. Specifically, it turns out that the transmission points #4 and #5 are connected to the transmission point #0 by way of the transmission point #1 and the transmission points #6 and #7 are connected to the transmission point #0 by way of the transmission point #2. In this case, as the calibration matrix C, the CAL coefficient computing unit 256 obtains a diagonal matrix whose diagonal components are the calibration coefficients $c_0$ to $c_8$. In other words, the CAL coefficient computing unit 256 generates a calibration matrix C indicated by the following Equation (3).

$$C = \mathrm{diag}(c_0, c_1, \ldots, c_8) \qquad (3)$$
$$= \mathrm{diag}\left(1, \frac{R_1}{T_1} \cdot \frac{T_0}{R_0}, \ldots, \frac{R_8}{T_8} \cdot \frac{T_0}{R_0}\right)$$
$$= \frac{T_0}{R_0} \cdot \mathrm{diag}\left(\frac{R_0}{T_0}, \frac{R_1}{T_1}, \ldots, \frac{R_8}{T_8}\right)$$

Herein, in Equation (3), diag( ) indicates a diagonal matrix. The calibration matrix C indicates a ratio of transfer functions of the transmitter circuit and receiver circuit in each of the transmission points #0 to #8 in which the transfer functions of the transmitter circuit and receiver circuit of the transmission point #0 are used as a reference. For this reason, a channel matrix of the downlink can be obtained by multiplying an inverse matrix $C^{-1}$ of the calibration matrix C by a channel matrix of the uplink.

The uplink signal receiving unit 257 receives an uplink signal that is transmitted from a user terminal and is received by each of the transmission points 110. The uplink signal receiving unit 257 then computes a channel estimation value between the user terminal and each of the transmission points 110 by using the uplink signal. At this time, the uplink signal receiving unit 257 generates an uplink channel matrix whose components are channel estimation values for each of combinations of the user terminals and the transmission points 110.

The channel estimation value correcting unit 258 corrects the channel estimation value computed by the uplink signal receiving unit 257 by using the CAL coefficient computed by the CAL coefficient computing unit 256. In other words, the channel estimation value correcting unit 258 corrects the channel estimation value of the uplink computed by the uplink signal receiving unit 257 by using the CAL coefficient so as to obtain a channel estimation value of the downlink. Specifically, the channel estimation value correcting unit 258 multiplies the inverse matrix $C^{-1}$ of the calibration matrix C generated by the CAL coefficient computing unit 256 by the uplink channel matrix generated by the uplink signal receiving unit 257. As a result, the channel estimation value correcting unit 258 obtains a downlink channel matrix from the uplink channel matrix.

The downlink signal transmitting unit 259 transmits a downlink signal whose transmission destination is a user terminal by using the channel estimation value of the downlink obtained by the channel estimation value correcting unit 258. Specifically, the downlink signal transmitting unit 259 generates a precoding matrix of the downlink signal by using the channel estimation value of the downlink, and transmits the precoded downlink signal to each of the transmission points 110. As a result, the downlink signal is transmitted with appropriate transmission weight from each of the transmission points 110, and thus interference in the user terminal can be reduced.

Figure 3:
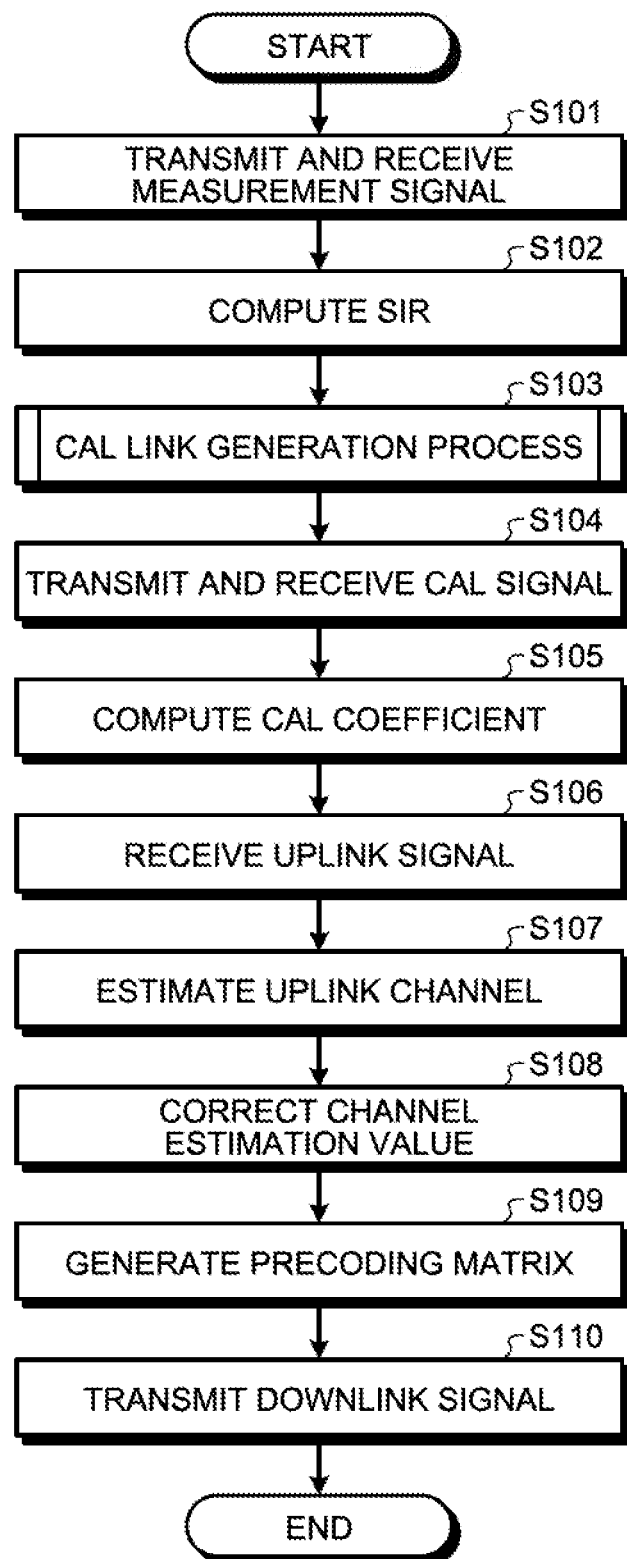
FIG. 3 is a flowchart illustrating a downlink transmission method according to the embodiment.

Next, a transmission method of a downlink signal performed by the baseband processing device 100 constituted as described above will be explained with reference to a flowchart illustrated in FIG. 3.

For example, when a predetermined period such as once a day comes or when an average reception level of CAL signals becomes less than a predetermined threshold, a well-known measurement signal is transmitted and received between the transmission points 110 in order to generate a CAL link (Step S101). Specifically, the transmission of a measurement signal from the one transmission point 110 is sequentially ordered by the measurement signal transmitting unit 250, and the measurement signal received by the other transmission point 110 is received by the measurement signal receiving unit 251. The transmission and reception of the measurement signal may be performed by using a guard period with which any signal of the downlink and uplink is not transmitted and received, for example.

Then, an SIR between the transmission points 110 is computed by using the measurement signal received by the measurement signal receiving unit 251 (Step S102). In other words, because a measurement signal is transmitted and received for each of all pairs of the transmission points 110, the SIR between the transmission points 110 of each pair is computed by the SIR computing unit 252. When the SIRs are computed for all pairs, a CAL link used for transmission and reception of the CAL signal is generated by the CAL link generating unit 253 (Step S103).

When generating the CAL link, the one starting-point transmission point 110 is selected, and the transmission points 110 whose SIRs satisfy a predetermined criterion are sequentially connected from the starting-point transmission point 110. At this time, CAL links are generated sequentially from the transmission points 110 for which the number of hops from the starting-point transmission point 110 is small. In other words, CAL links are generated sequentially from the high-order transmission points 110, and the generated CAL links are not changed when CAL links are generated for the low-order transmission points 110. A CAL link generation process will be below explained in detail.

When a CAL link is generated, a CAL signal is transmitted and received between the transmission points 110 connected by the CAL link (Step S104). Specifically, the transmission of a CAL signal from any of the transmission points 110 is sequentially ordered by the CAL signal transmitting unit 254, and the CAL signal received by the other transmission point 110 is received by the CAL signal receiving unit 255. At this time, the CAL signal transmitting unit 254 may instruct the even-hierarchical plurality of transmission points 110 to simultaneously transmit CAL signals, or may instruct the odd-hierarchical plurality of transmission points 110 to simultaneously transmit CAL signals. Herein, when the CAL signals are simultaneously transmitted from the plurality of transmission points 110, the CAL signals transmitted from the transmission points 110 include series perpendicular to each other.

When the CAL signal is transmitted and received, the CAL coefficient computing unit 256 performs channel estimation that uses the CAL signal, and computes a CAL coefficient for calibrating a difference between transmission characteristics of the transmitter circuit and receiver circuit of each of the transmission points 110 on the basis of the channel estimation value between the transmission points 110 (Step S105). Specifically, for example, the calibration matrix C and the inverse matrix $C^{-1}$ expressed with Equation (3) are computed by the CAL coefficient computing unit 256. The calibration matrix C is a matrix whose diagonal components are ratios of transmission characteristics of the transmitter circuit and receiver circuit of the transmission points 110. A channel matrix of the downlink is obtained by multiplying the inverse matrix $C^{-1}$ by the channel matrix of the uplink.

As described above, because calibration is performed by the transmission and reception of the CAL signal between the transmission points 110 connected by the CAL link, the channel matrix of the uplink is corrected to the channel matrix of the downlink. Therefore, when a signal of the uplink is transmitted from a user terminal, the signal is received by the transmission point 110 that is a communications partner of the user terminal and is transmitted to the baseband processing device 100. Then, an uplink signal is received by the uplink signal receiving unit 257 (Step S106), and the channel estimation of the uplink is performed (Step S107). In other words, the channel matrix of the uplink between the user terminal and the transmission point 110 is obtained by the uplink signal receiving unit 257.

The obtained channel matrix of the uplink is output to the channel estimation value correcting unit 258, and a channel estimation value is corrected by the channel estimation value correcting unit 258 (Step S108). Specifically, the channel matrix of the downlink is obtained by multiplying the inverse matrix $C^{-1}$ of the calibration matrix C by the channel matrix of the uplink.

Then, the channel matrix of the downlink is output to the downlink signal transmitting unit 259, and a precoding matrix to apply transmission weight to the signal of the downlink is generated by the downlink signal transmitting unit 259 (Step S109). At this time, the downlink signal transmitting unit 259 generates the precoding matrix by using the channel estimation value corrected by the channel estimation value correcting unit 258. In other words, the precoding matrix is generated on the basis of the channel matrix of the downlink obtained by correcting the channel matrix of the uplink.

Then, the signal of the downlink for the user terminal is precoded by using the precoding matrix and is transmitted from the transmission interface unit 201 to each of the transmission points 110 (Step S110). The signal of the downlink is wirelessly transmitted from each of the transmission points 110 to the user terminal. As described above, because the precoding matrix is obtained from the downlink channel matrix obtained by correcting an uplink channel matrix in order to precode the signal of the downlink, it is possible to improve reception characteristics of the signal of the downlink in the user terminal.

Herein, there will be explained a point that reception characteristics of the downlink are improved by correcting a channel estimation value on the basis of the calibration matrix C obtained by calibration between the transmission points 110.

To simplify the explanation, assuming that any of the transmission points 110 and the user terminals has only one antenna, radio channels that are formed between the N transmission points 110 and the M user terminals are expressed with the following channel matrix H.

$$H = \begin{bmatrix} h_{0,0} & \cdots & h_{0,N-1} \\ \vdots & \ddots & \vdots \\ h_{M-1,0} & \cdots & h_{M-1,N-1} \end{bmatrix}$$

Herein, $h_{m,n}$ indicates a channel estimation value of a radio channel between the user terminal #m and the transmission point #n, and can be considered as the same value in the uplink and downlink. For this reason, when the channel estimation of the signals of the uplink received from the user terminals is performed by the transmission points 110, the following uplink channel matrix G is obtained.

$$G = \begin{bmatrix} t_0 \cdot h_{0,0} \cdot R_0 & \cdots & t_0 \cdot h_{0,N-1} \cdot R_{N-1} \\ \vdots & \ddots & \vdots \\ t_{M-1} \cdot h_{M-1,0} \cdot R_0 & \cdots & t_{M-1} \cdot h_{M-1,N-1} \cdot R_{N-1} \end{bmatrix}$$

Herein, $t_m$ and $r_m$ respectively indicate transfer functions of the transmitter circuit and receiver circuit of the user terminal #m, and $T_n$ and $R_n$ respectively indicate transfer functions of the transmitter circuit and receiver circuit of the transmission point #n. On the other hand, a downlink channel matrix F is expressed as follows.

$$\begin{aligned} F &= \begin{bmatrix} T_0 \cdot h_{0,0} \cdot r_0 & \cdots & T_{N-1} \cdot h_{0,N-1} \cdot r_0 \\ \vdots & \ddots & \vdots \\ T_0 \cdot h_{M-1,0} \cdot r_{M-1} & \cdots & T_{N-1} \cdot h_{M-1,N-1} \cdot r_{M-1} \end{bmatrix} \\ &= \mathrm{diag}\left(\frac{r_0}{t_0}, \ldots \frac{r_{M-1}}{t_{M-1}}\right) \begin{bmatrix} t_0 \cdot h_{0,0} \cdot R_0 & \cdots & t_0 \cdot h_{0,N-1} \cdot R_{N-1} \\ \vdots & \ddots & \vdots \\ t_{M-1} \cdot h_{M-1,0} \cdot R_0 & \cdots & t_{M-1} \cdot h_{M-1,N-1} \cdot R_{N-1} \end{bmatrix} \\ &\quad \mathrm{diag}\left(\frac{T_0}{R_0}, \ldots \frac{T_{N-1}}{R_{N-1}}\right) \\ &= B \cdot G \cdot A \end{aligned}$$

Herein, a matrix B is a diagonal matrix whose diagonal components are ratios of transfer functions of the transmitter circuit and receiver circuit of each of the user terminals, and a matrix A is a diagonal matrix whose diagonal components are ratios of transfer functions of the transmitter circuit and receiver circuit of each of the transmission points 110. As described above, a difference between transmission characteristics of the transmitter circuits and receiver circuits of the transmission points 110 and the user terminals exists between the uplink channel matrix G and the downlink channel matrix F.

Meanwhile, the calibration matrix C expressed with Equation (3) can be indicated by using the matrix A as described below.

$$\begin{aligned} C &= \frac{T_0}{R_0} \cdot \mathrm{diag}\left(\frac{R_0}{T_0}, \frac{R_1}{T_1} \ldots \frac{R_8}{T_8}\right) \\ &= \frac{T_0}{R_0} \cdot A^{-1} \end{aligned}$$

A corrected downlink channel matrix F' obtained by correcting the uplink channel matrix G by using the inverse matrix $C^{-1}$ of the calibration matrix C is as follows.

$$\begin{aligned} F' &= G \cdot C^{-1} \\ &= (B^{-1} \cdot F \cdot A^{-1})\left(\frac{R_0}{T_0} \cdot A\right) \\ &= \frac{R_0}{T_0} \cdot B^{-1} \cdot F \end{aligned}$$

A transmission weight matrix W of the downlink when the corrected downlink channel matrix F' is used employs the following ZF (Zero Forcing) method, for example.

$$W = F'^H \cdot (F' \cdot F'^H)^{-1}$$

Herein, $F'^H$ indicates a Hermitian matrix of the corrected downlink channel matrix F'.

Reception symbols $(y_0, \ldots, y_{M-1})$ in the user terminals when the transmission weight matrix W is applied to transmission symbols $(s_0, \ldots, s_{M-1})$ for the M user terminals are as follows.

$$\begin{bmatrix} y_0 \\ \vdots \\ y_{M-1} \end{bmatrix} = F \cdot W \cdot \begin{bmatrix} s_0 \\ \vdots \\ s_{M-1} \end{bmatrix}$$

$$= \left(\frac{T_0}{R_0} \cdot B \cdot F'\right) \cdot \left\{F'^H \cdot (F' \cdot F'^H)^{-1}\right\} \cdot \begin{bmatrix} s_0 \\ \vdots \\ s_{M-1} \end{bmatrix}$$

$$= \frac{T_0}{R_0} \cdot B \cdot \begin{bmatrix} s_0 \\ \vdots \\ s_{M-1} \end{bmatrix}$$

Herein, because the matrix B is a diagonal matrix whose diagonal components are ratios of transfer functions of the transmitter circuit and receiver circuit of each of the user terminals, an equivalent channel F·W of the downlink between each of the transmission points 110 and the user terminals is expressed with a diagonal matrix. Therefore, transmission symbols for the user terminals are respectively received by the user terminals without interfering with each other in the channel of the downlink. Moreover, the reception symbol $y_m$ corresponding to the transmission symbol $s_m$ for the user terminal #m is expressed with the following Equation.

$$y_m = \frac{T_0}{R_0} \cdot \frac{r_m}{t_m} \cdot s_m$$

In other words, a reception symbol in each user terminal receives distortion corresponding to a ratio of transfer functions of the transmitter circuit and receiver circuit of the transmission point #0 that becomes a reference of calibration and a ratio of transfer functions of the transmitter circuit and receiver circuit of the user terminal itself. The distortion can be compensated in the reception process of the user terminal, and the reception characteristics of the signal of the downlink can be improved by compensating for distortion.

As described above, the uplink channel matrix G is corrected by the inverse matrix $C^1$ of the calibration matrix C, and the transmission symbol of the downlink is precoded by using the transmission weight matrix W based on the obtained corrected downlink channel matrix F'. As a result, reception characteristics can be improved without mutual interference of transmission symbols of the downlink.

Figure 4:
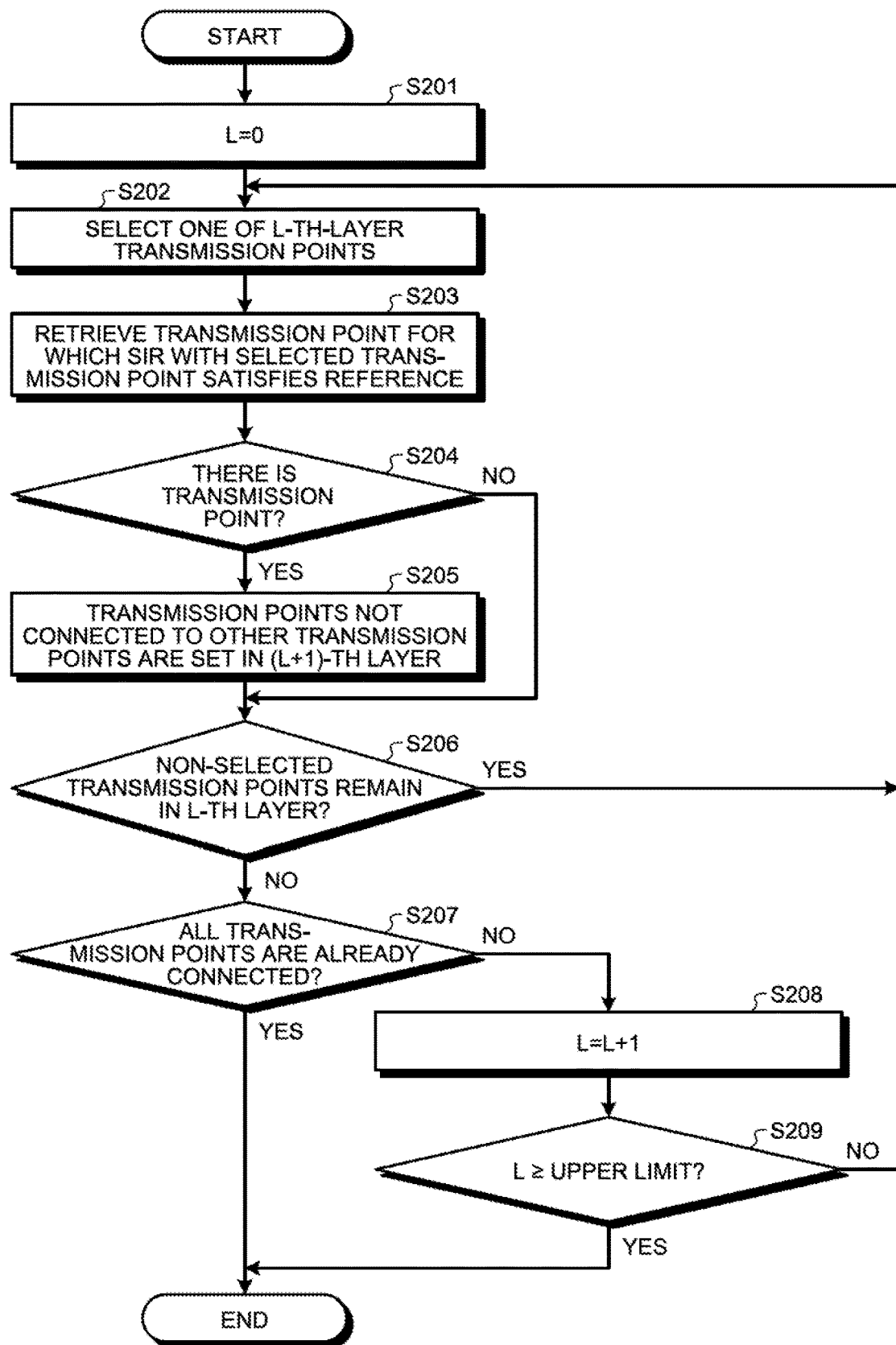
FIG. 4 is a flowchart illustrating a CAL link generation process.

Next, the CAL link generation process will be explained with reference to a flowchart illustrated in FIG. 4. The CAL link generation process illustrated in FIG. 4 is mainly performed by the CAL link generating unit 253.

First, a parameter L that indicates a hierarchy corresponding to the number of hops from a starting point is initialized to zero (Step S201). Then, one of the L-th-layer transmission points 110 is selected (Step S202). Herein, because the parameter L is zero, the starting-point transmission point 110 is selected. In case of the selection of the starting-point transmission point 110, for example, the transmission point 110 geographically located near the center may be selected among all the transmission points 110 connected to the baseband processing device 100. Moreover, one of the transmission points 110, for which an average value of SIRs between the one and the other transmission points 110 computed by using measurement signals is the highest, may be selected as the starting-point transmission point 110.

When the L-th-layer transmission point 110 (herein, starting-point transmission point 110) is selected, ones of the transmission points 110 for which SIRs between the ones and the selected transmission point 110 are not less than a predetermined threshold are retrieved (Step S203). Then, it is determined whether there is the transmission point 110 for which the SIR satisfies a criterion (Step S204). When there is the transmission point 110 satisfying the criterion among the selected transmission points 110 (Step S204: Yes), the transmission points 110 not connected to the other transmission points 110 are set as the (L+1)th-layer transmission points 110 (Step S205). In other words, CAL links are generated between the selected L-th-layer transmission points 110 and the (L+1)th-layer transmission points 110 not connected to the other transmission points 110 by the CAL links.

For this reason, even in case of transmission points for which SIRs between the transmission points and the selected transmission points 110 satisfy the criterion, ones of the transmission points that are already connected to the other transmission points 110 by the CAL links are not connected to the selected transmission points 110 by the CAL links. As a result, the already-generated CAL links are not changed later, and thus the increase of processing amount for CAL link generation can be suppressed.

Then, when CAL links to be connected to the selected L-th-layer transmission points 110 are generated or when there is not the transmission point 110 that satisfies the criterion with respect to the selected transmission points 110 (Step S204: No), it is determined whether the non-selected transmission points 110 remain in the L-th layer (Step S206). As the determination result, when the non-selected transmission points 110 remain (Step S206: Yes), one of the L-th-layer non-selected transmission points 110 is selected (Step S202), and the generation of the CAL link based on the SIR is repeated similarly to the above.

Herein, because the selected transmission point 110 is the starting-point transmission point 110, there is not is the non-selected transmission point 110 in the L-th layer (Step S206: No). Therefore, it is determined whether all the transmission points 110 connected to the baseband processing device 100 are already connected by the CAL links (Step S207). In other words, CAL links are generated between the starting-point transmission point 110 and the first-layer transmission points 110 for which SIRs satisfy the criterion, and consequently it is determined whether all the transmission points 110 are connected by the CAL links. As the determination result, when all the transmission points 110 are connected (Step S207: Yes), the CAL link generation process is terminated.

On the other hand, when there remain the transmission points 110 that are not connected to any of the transmission points 110 by the CAL links (Step S207: No), the parameter L is incremented (Step S208), and it is determined whether the parameter L after the increment is not less than a predetermined upper limit (Step S209). As the result of determination, when the parameter L reaches the predetermined upper limit (Step S209: Yes), it is determined that it is difficult to continue the generation of the CAL link under a condition that the SIR satisfies the criterion or the number of hops from the starting-point transmission point 110 to the terminal transmission point 110 becomes excessive, and the CAL link generation process is terminated.

When the parameter L after the increment does not reach the predetermined upper limit (Step S209: No), one of the L-th-layer transmission points 110 is selected (Step S202). In other words, when the parameter L is incremented to be "1" after the CAL links are generated between the starting-point transmission point 110 and the first-layer transmission points 110, for example, one of the first-layer transmission points 110 is selected.

Then, transmission points for which SIRs between the transmission points and the selected first-layer transmission points 110 are not less than a predetermined threshold are retrieved (Step S203), and the transmission points 110 for which the SIRs satisfy the condition are set to the second-layer transmission points 110 to be connected to the selected first-layer transmission points 110 by the CAL links (Steps S204 and S205). At this time, because the starting-point transmission point 110 and the first-layer other transmission points 110 are the transmission points 110 that are already connected to the other transmission points 110, these transmission points 110 are not connected to the selected first-layer transmission points 110 even if the SIRs related to these transmission points 110 satisfy the criterion. Similarly, even if the SIRs related to the second-layer transmission points 110 that are already connected to the first-layer other transmission points 110 by the CAL links satisfy the criterion, the second-layer transmission points 110 are not connected to the selected first-layer transmission points 110.

After that, the transmission points 110 are connected by the CAL links in sequence from a high-order hierarchy close to the starting-point transmission point 110, and thus the number of hops from the starting-point transmission point 110 to the terminal transmission point 110 becomes the minimum. As a result, in the calibration of transmitting and receiving a CAL signal via a CAL link, calibration errors accumulated every CAL link become the minimum, and thus high-precision calibration becomes possible.

Next, a specific example of the CAL link generation process described above will be explained with reference to FIGS. 5A, 5B, 6A, and 6B. In FIGS. 5A, 5B, 6A, and 6B, white points indicate positions of transmission points, and arrows of solid lines and dotted lines indicate CAL links.

Figure 5A:
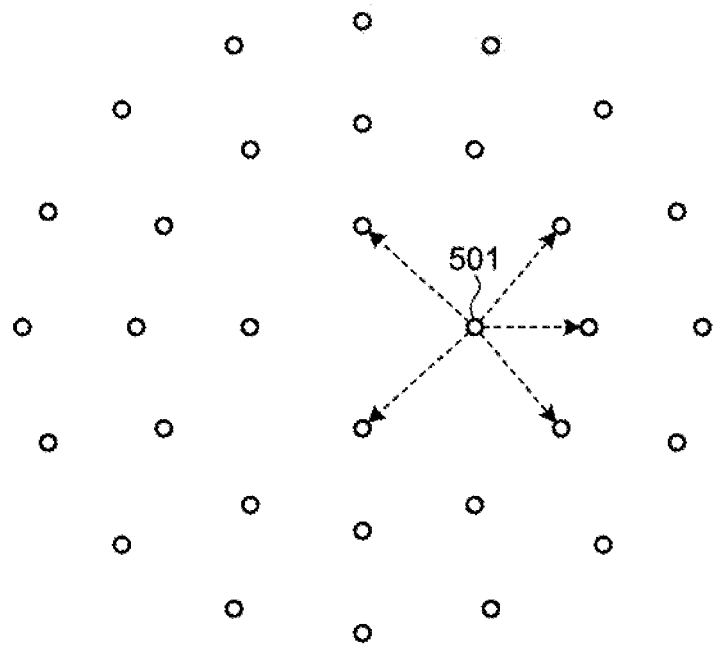
FIGS. 5A, 5B, 6A, and 6B are diagrams illustrating specific examples of generating CAL links.

As illustrated in FIG. 5A, when a starting-point transmission point 501 is selected, transmission points for which SIRs between these transmission points and the transmission point 501 are not less than a predetermined threshold are set as first-layer transmission points, and are connected to the starting-point transmission point 501 by CAL links. In FIG. 5A, five transmission points are set as the first-layer transmission points, and are connected to the starting-point transmission point 501 by the CAL links.

Figure 5B:
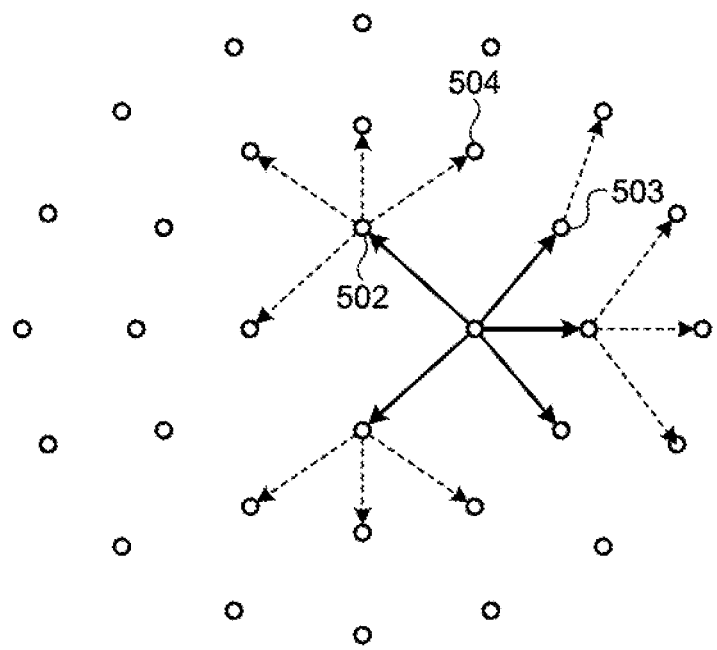

Then, as illustrated in FIG. 5B, the first-layer transmission points are sequentially selected, and transmission points, for which SIRs between these transmission points and the selected first-layer transmission point are not less than the predetermined threshold, are set as second-layer transmission points and are connected to the selected first-layer transmission point by CAL links. At this time, when a first-layer transmission point 502 is selected in advance of a first-layer transmission point 503, for example, a second-layer transmission point 504 connected to the first-layer transmission points 502 by the CAL link is not afterward connected to the first-layer transmission points 503 by a CAL link. In other words, even if the SIR between the first-layer transmission point 503 and the transmission point 504 is better than the SIR between the first-layer transmission point 502 and the transmission point 504, because the transmission point 504 is already connected to the transmission point 502 at the time when the first-layer transmission point 503 is selected, the selected transmission point 503 and transmission point 504 are not connected by a CAL link.

As described above, if the SIR satisfies a criterion, paired transmission points are connected by a CAL link even if the pair is not an optimum combination, and thus the pair of transmission points is not changed afterward. For this reason, a process etc. for comparing SIRs in order to form an optimum pair of transmission points can be omitted, and thus the increase of processing amount can be suppressed.

Figure 6A:
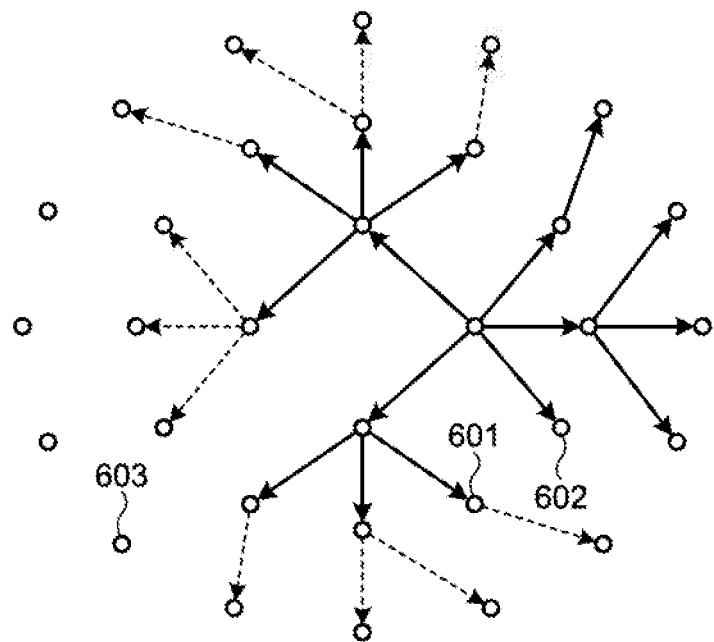

When all the first-layer transmission points are totally connected to the second-layer transmission points, the second-layer transmission points are sequentially selected, and transmission points for which SIRs between these transmission points and the selected second-layer transmission point are not less than the predetermined threshold are set as third-layer transmission points and are connected to the selected second-layer transmission point by CAL links, as illustrated in FIG. 6A. Also in this case, even if the SIR satisfies the criterion, transmission points already connected to the other transmission points are not connected to the selected transmission point by the CAL links. Therefore, even if an SIR between a second-layer transmission point 601 and a first-layer transmission point 602 is good, for example, because the transmission point 602 is already connected to the starting-point transmission point at the time when the second-layer transmission point 601 is selected, the selected transmission point 601 and the transmission point 602 are not connected by a CAL link.

Figure 6B:
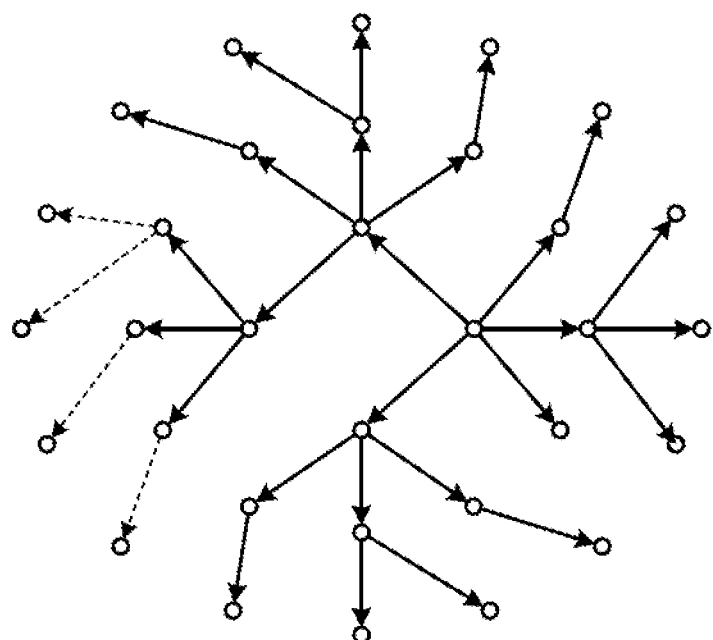

When all the second-layer transmission points are totally connected to the third-layer transmission points, it is determined whether all transmission points are connected by CAL links. Herein, like a transmission point 603 for example, there is a transmission point that is not connected by a CAL link. For this reason, as illustrated in FIG. 6B, the third-layer transmission points are continuously selected sequentially, and transmission points for which SIRs between these transmission points and the selected third-layer transmission point are not less than the predetermined threshold are set as fourth-layer transmission points and are connected to the selected third-layer transmission point by CAL links. In this example, as illustrated in FIG. 6B, by generating CAL links through the provision of the fourth-layer transmission points, all the transmission points are connected to the starting-point transmission point by the CAL links. As a result, it is possible to generate CAL links that can reach an arbitrary transmission point by way of the CAL links from the starting-point transmission point, and thus a calibration coefficient of an arbitrary transmission point that uses the starting-point transmission point as a reference can be computed by the transmission and reception of CAL signals through the CAL links. As a result, it is possible to generate the calibration matrix C, as illustrated in Equation (3) for example, whose diagonal components are calibration coefficients related to transmission points.

As described above, according to the present embodiment, transmission points for which the SIRs satisfy the criterion are connected by CAL links for each hierarchy from the starting-point transmission point, and the already generated CAL links are not changed. Then, when all the transmission points are connected by the CAL links, calibration is performed by transmitting and receiving CAL signals via the CAL links. For this reason, when generating the CAL links, it is possible to omit a process etc. in which SIRs between transmission points are compared to form an optimum pair of transmission points, and it is possible to suppress the increase of processing amount to realize calibration between the transmission points. Moreover, the number of hops from the starting-point transmission point to the terminal transmission point becomes the minimum, and consequently calibration errors accumulated every CAL link become the minimum. Therefore, high-precision calibration becomes possible.

In the embodiment, even when all the transmission points 110 connected to the baseband processing device 100 are not completely connected by CAL links, the CAL link generation process may be completed. In other words, in the flowchart illustrated in FIG. 4, even if all the transmission points 110 are not completely connected (Step S207: No), the parameter L reaches the predetermined upper limit (Step S209: Yes) and thus the CAL link generation process may be completed in some cases. In such a case, the CAL link generation process may be again performed after selecting the new starting-point transmission point 110 from among the unconnected transmission points 110.

Figure 7:
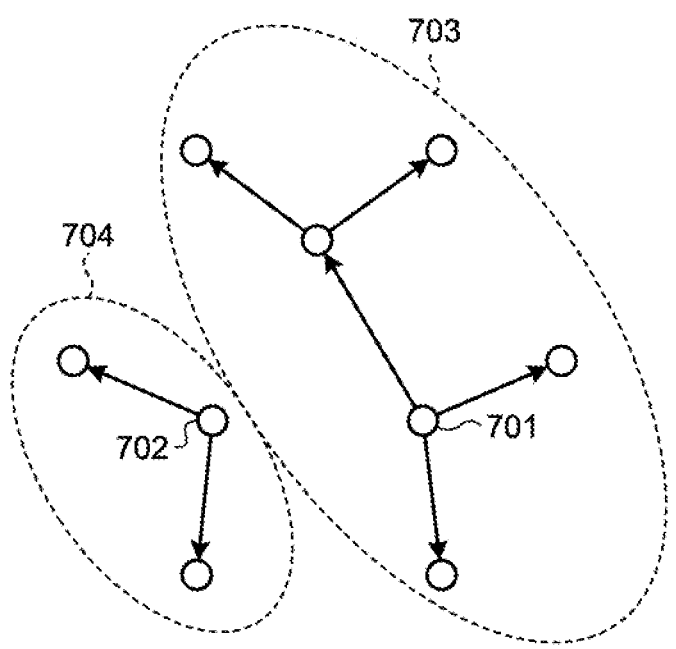
FIG. 7 is a diagram illustrating a specific example of a CAL link.
Figure 9:
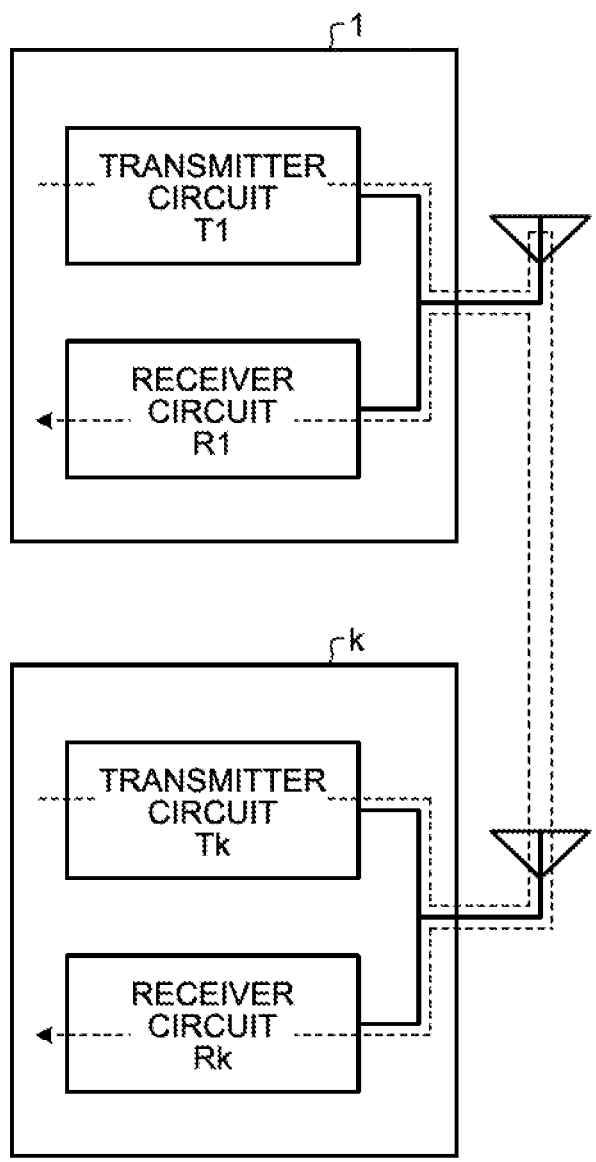
FIG. 9 is a diagram explaining calibration.

By doing so, as illustrated in FIG. 7 for example, two starting-point transmission points 701 and 702 are set, and groups 703 and 704 respectively connected to the starting-point transmission points 701 and 702 are formed. These groups 703 and 704 may be a group of transmission points that transmit downlink signals in coordination with each other when transmitting the downlink signals. In other words, when the plurality of transmission points cooperatively transmit signals to the user terminals, the transmission points belonging to the group 703 may cooperate with each other, or the transmission points belonging to the group 704 may cooperate with each other. In the groups 703 and 704, because calibration that uses the starting-point transmission points 701 and 702 as a reference can be performed, the plurality of transmission points on which calibration is performed can cooperatively transmit signals through cooperation between the transmission points of each of the groups 703 and 704.

Other Embodiment

In the embodiment, it has been explained that the already generated CAL link is not changed. Depending on a connection situation of CAL links from the starting-point transmission point to the terminal transmission point, accumulated errors during calibration may become large. In other words, because individual CAL links are generated between transmission points for which SIRs satisfy the criterion, a calibration error (abbreviated to "CAL error") in each CAL link is small. However, because a plurality of CAL links can be included between the starting-point transmission point and the terminal transmission point, a calibration error in a pair of the specified transmission points can become large when CAL errors in the CAL links are accumulated.

Therefore, after the same CAL link generation process as that of the embodiment is performed, the CAL link may be modified to reduce an accumulated error. Specifically, the CAL link generating unit 253 of the baseband processing device 100 performs the CAL link generation process with reference to a CAL error table illustrated in FIG. 8 for example, and then computes an accumulated error from the starting-point transmission point to the terminal transmission point. In other words, when the starting-point transmission point and the terminal transmission point are connected by a CAL link, which connects transmission points for which SIRs are less than $A_1$, and a CAL link, which connects transmission points for which SIRs are not less than $A_2$ and are less than $A_3$, for example, an accumulated error up to the terminal transmission point is computed as $(B_1+B_3)$. Then, the CAL link generating unit 253 computes accumulated errors up to the terminal transmission points, and modifies the CAL link to reduce the accumulated error when there is a transmission point for which the accumulated error is not less than a predetermined threshold.

Figure 8:
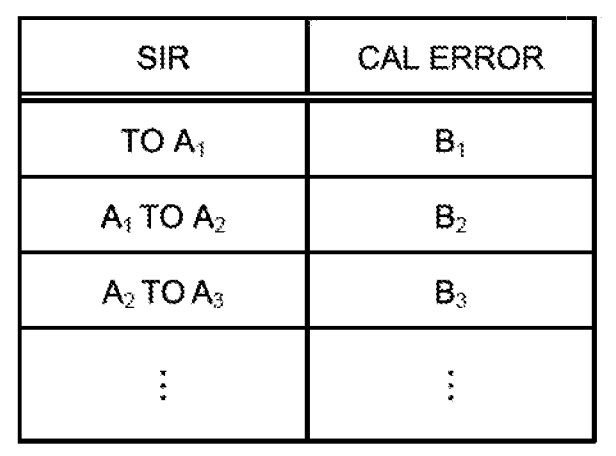

As a result, the CAL link for reducing an accumulated error of calibration can be generated, and thus the precision of calibration can be further improved. Moreover, the CAL error table illustrated in FIG. 8 is a table that stores a CAL error to be expected every SIR in association with each other. The CAL error table is previously prepared through simulation and is stored in the memory 204.

According to one aspect of a transmission control device, a radio communication system, and a calibration method disclosed in the present application, calibration between transmission points can be realized along with suppressing the increase of processing amount.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A transmission control device comprising:
a memory; and
a processor connected to the memory, wherein
the processor executes a process comprising:
selecting a reference transmission point as a starting point of generating a link from among a plurality of transmission points of which each wirelessly transmits a signal;
sequentially selecting the transmission points one by one for each hierarchy corresponding to a number of hops from the reference transmission point and retrieving satisfying transmission points which satisfy a predetermined criterion of radio quality with a currently selected transmission point; and
generating links between the currently selected transmission point and the satisfying transmission points not yet connected to another transmission point by another link.
2. The transmission control device according to claim 1, wherein
the process further comprises:
causing the plurality of transmission points to transmit and receive a calibration signal via the links generated between the plurality of transmission points; and
computing, based on a channel estimation result obtained by using the calibration signal, a calibration coefficient calibrating a difference between transmission characteristics of a transmitter circuit and a receiver circuit included in the plurality of transmission points.

3. The transmission control device according to claim 2, wherein the causing includes:
  causing a plurality of transmission points belonging to one of an even hierarchy and an odd hierarchy to simultaneously transmit the calibration signal; and
  causing a transmission point belonging to another of the even hierarchy and the odd hierarchy to receive the transmitted calibration signal.

4. The transmission control device according to claim 1, wherein
  the memory stores an error table that stores a calibration error to be expected every radio quality in association with each other, and
  the process further comprises:
    computing, with reference to the error table, an accumulated error obtained by accumulating calibration errors corresponding to radio quality of links between the reference transmission point and the other transmission points; and
    modifying the links generated between the reference transmission point and the other transmission points when the computed accumulated error is not less than a predetermined threshold.

5. A radio communication system that includes a transmission control device and a plurality of transmission points connected to the transmission control device,
  the transmission control device comprising:
    a memory; and
    a processor connected to the memory, wherein
    the processor executes a process comprising:
      selecting a reference transmission point as a starting point of generating a link from among the plurality of transmission points of which each wirelessly transmits a signal;
      sequentially selecting the transmission points one by one for each hierarchy corresponding to a number of hops from the reference transmission point and retrieving satisfying transmission points which satisfy a predetermined criterion of radio quality with a currently selected transmission point; and
      generating links between the currently selected transmission point and the satisfying transmission points not connected to another transmission point by another link, and
  each of the transmission points comprising:
    a transmitter circuit that performs a radio transmission process on a calibration signal and transmits the calibration signal after the radio transmission process via the generated links; and
    a receiver circuit that receives a calibration signal via the generated links and performs a radio reception process on the received calibration signal.

6. A calibration method comprising:
  selecting, using a processor, a reference transmission point as a starting point of generating a link from among a plurality of transmission points of which each wirelessly transmits a signal;
  sequentially selecting, using the processor, the transmission points one by one for each hierarchy corresponding to a number of hops from the reference transmission point and retrieving, using the processor, satisfying transmission points which satisfy a predetermined criterion of radio quality with a currently selected transmission point; and
  generating, using the processor, links between the currently selected transmission point and the satisfying transmission points not yet connected to another transmission point by another link;
  transmitting and receiving a calibration signal via the links generated between the plurality of transmission points; and
  computing, using the processor, based on a channel estimation result obtained by using the calibration signal, a calibration coefficient calibrating a difference between transmission characteristics of a transmitter circuit and a receiver circuit included in the plurality of transmission points.

* * * * *